Aug. 30, 1966  J. H. SMITH  3,270,199

SPEED CONTROL SYSTEM FOR VEHICLES

Filed Sept. 14, 1962

INVENTOR.
J.H. SMITH
BY Forest B. Hitchcock
HIS ATTORNEY

FIG. 2B

United States Patent Office 3,270,199
Patented August 30, 1966

3,270,199
SPEED CONTROL SYSTEM FOR VEHICLES
Joseph Harvey Smith, Rochester, N.Y., assignor to General Signal Corporation, a corporation of New York
Filed Sept. 14, 1962, Ser. No. 223,662
13 Claims. (Cl. 246—182)

This invention generally relates to speed control systems for vehicles and more particularly pertains to a speed control system for vehicles desired to operate at a variable speed.

It is often desirable to be able to control vehicles to operate at a variable desired speed. For example, one instance where such variable speed control is particularly desirable, is during the remote control of railway dump trains, during railway mining operations, where such trains are utilized for transporting the material being mined, from a loading location where the raw material is loaded on the cars, by means of a conveyer or the like, to the mine dumping location. More specifically, since the rate at which the raw material is being conveyed to the cars may be continually varying, it is obviously necessary to be able to similarly vary the speed of the train being loaded so that all cars receive the desired load of material; i.e. to prevent uneven loading.

In view of the above, it is generally proposed in accordance with the present invention to provide a variable speed control system whereby a vehicle can be properly controlled to operate at a variable desired speed. More specifically, in the selected embodiment illustrated in the drawings, the variable speed control system of the present invention is utilized to permit remote variable speed control of a railway vehicle, in accordance with a variable frequency wayside signal communicated to the vehicle, the frequency of the wayside signal being distinctive of the desired vehicle speed.

In many of the speed control systems previously proposed, the desired speed is remotely registered on the vehicle in accordance with a signal communicated to the vehicle from the wayside, whose frequency is indicative of the desired vehicle speed. It is possible in such previously proposed systems, because of the use of widely separated signal frequencies to select widely separated desired speeds, to employ frequency responsive means on the vehicle, such as, for example, filter networks or the like to detect the frequency of the wayside signal, and, in accordance with which the speed selecting means on the vehicle are operated to register the desired vehicle speed.

In these previously proposed speed control systems, an axle-driven frequency generator is provided on the vehicle which generates an output frequency proportional to the actual vehicle speed, for example, twenty cycles per second of generated frequency for each mile per hour of actual vehicle speed. Additional frequency responsive means such as filters or the like, are then provided on the vehicle and are selectively rendered effective, by the registration of the desired vehicle speed, to respond to the actual speed analog frequency from the axle-driven frequency generator whereby the actual vehicle speed is effectively compared to the desired vehicle speed, so that the vehicle throttle and brake mechanisms may be properly operated to maintain the vehicle at the desired operating speed.

However, while these uses of such frequency responsive means, are permissible where it is not necessary to detect relatively small variations in the actual and desired speeds, the employment of such filters in a variable speed control system, as proposed in accordance with the present invention, is quite impractical because of the difficulties involved in designing filters which have very sharp response characteristics as would be necessary where relatively slight changes in the actual and desired speed frequency analogs must be detected, in order to provide the necessary close control of vehicles desired to operate at a variable speed, which may range, for example, anywhere between one-eighth and three-eighths mile per hour, in mining operations such as those previously mentioned.

In order to provide a variable speed control system which will detect relatively slight changes in the actual and desired vehicle speeds, it is proposed, in accordance with the present invention, to first convert the variable frequency wayside signal from a frequency analog of the desired vehicle speed into a D.C. voltage whose magnitude is proportional to the desired vehicle speed.

As in the previously proposed speed control systems, an axle-driven frequency generator provided on the vehicle produces an output frequency proportional to the actual vehicle speed, but in accordance with the present invention, such actual speed analog frequency is then converted into a series of pulses, one pulse being produced for each cycle output from the frequency generator, whereby the number of pulses produced in a given time period represents an analog of the actual vehicle speed. In accordance with this first series of developed pulses, a second series of ramp voltage pulses are developed, between the respective pulses of the first mentiond pulse series, in such a manner that each ramp voltage pulse attains the magnitude which is directly proportional to the time between adjacent pulses of the first pulse series and inversely proportional to the frequency output of the axle-driven frequency generator, and therefore, the magnitude of these ramp voltage pulses is also inversely proportional to; i.e. is the analog of, the actual vehicle speed. In this manner, it is possible to obtain a usable analog of the actual vehicle speed even when the vehicle is travelling at very low speeds, such as between one eighth and three-eighths mile per hour, at which speeds the axle-driven frequency generator mentioned above produces an output frequency of between two and one-half and seven and one-half cycles per second; which frequency range would be quite difficult to work with, in a speed control system where filters were utilized to detect variations in the actual vehicle speed.

This series of ramp voltage pulses, indicative of the actual vehicle speed, is then compared on a magnitude basis to the D.C. voltage analog of the desired vehicle speed, and, in the illustrated embodiment of the present invention, the vehicle speed is decreased if the magnitude of the D.C. voltage analog is greater than the magnitude of the ramp pulses, indicating that the vehicle is over-speed; while the vehicle speed is increased if the magnitude of the D.C. voltage analog is less than the magnitude of the ramp pulses, indicating that the vehicle is under speed.

In view of the above, a general object of the present invention is to provide a speed control system for vehicles desired to operate at a variable speed.

Another object of the present invention is to provide a variable speed control system for vehicles wherein the actual vehicle speed is accurately maintained at the variable desired speed.

A more specific object of the present invention is to provide for remotely controlling of a vehicle to operate at a variable desired speed in accordance with a variable frequency signal communicated from the wayside to the vehicle, the frequency of said signal being indicative of the desired vehicle speed.

Other objects, purposes, and characteristic features of the present invention will be in part obvious from the accompanying drawings and in part pointed out as the description of the invention progresses.

In describing the invention in detail, reference will be made to the accompanying drawings wherein.

Figure 1:
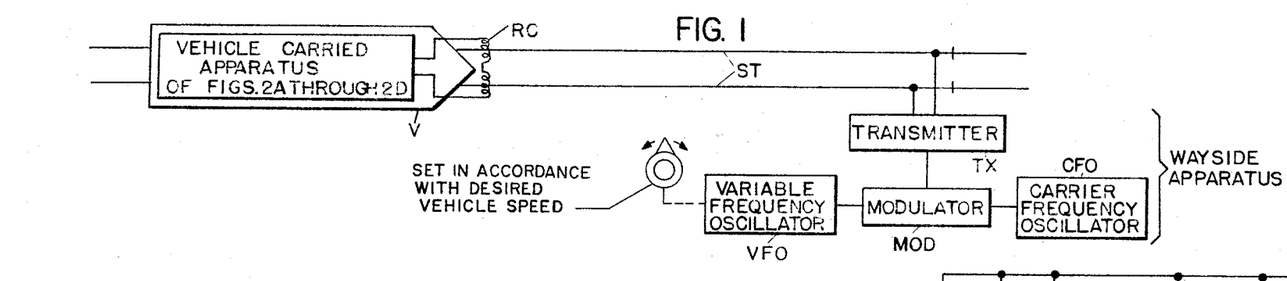
FIG. 1 illustrates a partial section of railway track and the wayside apparatus for one embodiment of the present invention.

Referring to FIG. 1 of the accompanying drawings, a partial stretch of railway track ST is illustrated having certain track circuit communication means connected across its right-hand end, as viewed in the drawings, for communicating a variable frequency signal to the vehicle V; the frequency of which is proportional to the desired operating speed of the vehicle V, over the illustrated stretch of track ST. For example, the illustrated stretch of track ST might extend through the loading area of a mining operation, and, the vehicle V might represent a dump train being loaded, with the raw material being mined, by a suitable conveyor or the like (not shown).

More particularly, the wayside apparatus of FIG. 1 includes a transmitter TX, modulator MOD, carrier frequency oscillator CFO and variable frequency oscillator VFO. By way of example, the carrier frequency oscillator CFO is assumed here to generate a fixed one kilocycle output frequency, while the variable frequency oscillator VFO is assumed to be capable of generating a variable output frequency, for example, between twenty and forthy-five cycles per second. In the illustrated embodiment of the present invention, this variable frequency oscillator VFO is assumed to be controlled by a wayside operator who manually varies the output frequency of oscillator VFO, in accordance with the desired speed of vehicle V, and, this oscillator VFO may be of any suitable characteristic, for producing the necessary variable frequency output.

The one kilocycle carrier frequency, modulated by the output of oscillator VFO, is applied to the rails of track ST, by transmitter TX, and is inductively received, on the vehicle V, by receiver coils RC which are mounted at the leading end of the vehicle, and, the received signal is then supplied as input to the vehicle carried apparatus of FIGS. 2A through 2D.

Figure 2A:
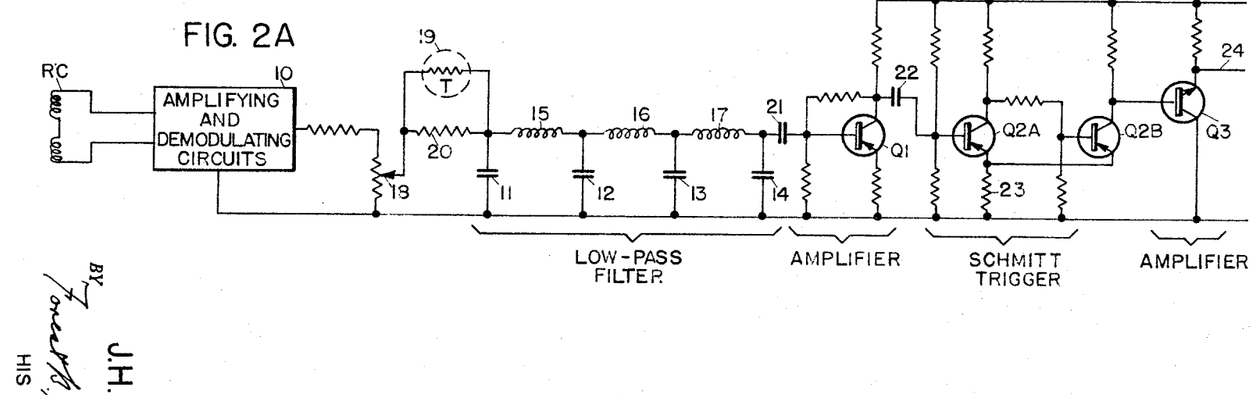
FIGS. 2A through 2D illustrate the vehicle carried apparatus for the same embodiment of the present invention.

Referring now to FIG. 2A, the input signal inductively received, at receiver coils RC, is first amplified and demodulated by Amplifying and Demodulating Circuits 10 and is then applied as input to a low-pass filter network, including capacitors 11 through 14 and inducators 15 through 17, which rejects all but the variable frequency from the wayside variable frequency oscillator VFO, of FIG. 1. In FIG. 2A, the potentiometer 18 is provided to adjust the input signal level to the low-pass filter, and, thermistor 19 is connected in multiple with the filter input resistor 20 to provide temperature compensation for ambient temperature variations, as is well-known in the art.

The variable frequency signal passed by this low-pass filter, is then applied, through coupling capacitor 21, as input to an amplifier stage, including transistor Q1, which amplifiers such variable frequency signal, and after amplification, the variable frequency signal is applied, through coupling capacitor 22, as input to a Schmitt trigger circuit, including transistors Q2A and Q2B and common emitter resistor 23, which operates in the conventional manner and converts the input signal into a series of square waves for application to the amplifying transistor Q3; the frequency of the square wave series being the same as that of the variable frequency input signal.

Figure 2B:
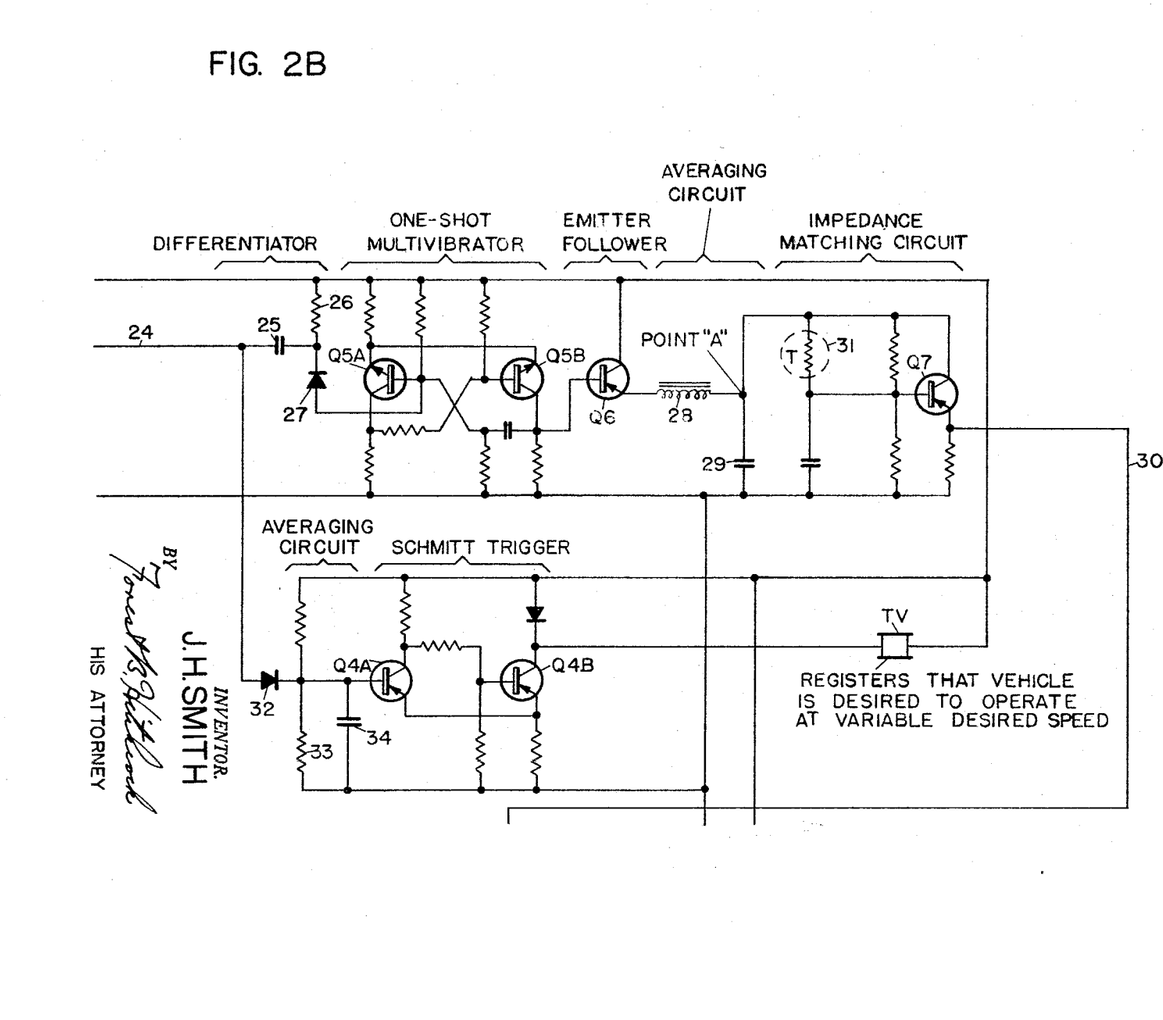

The square wave output from amplifier Q3 is applied, over wire 24 between FIGS. 2A and 2B, to a differentiating circuit, in FIG. 2B, including capacitor 25 and resistor 26, which then produces a series of alternate positive and negative pulses. Diodes 27 is connected between this differentiator and the base of transistor Q5A, to permit only the negative going pulses to be applied as input to one-shot multivibrator, including transistors Q5A and Q5B.

This one-shot multivibrator is circuited so that transistor Q5A is normally conducting while transistor Q5B is cut off. Therefore, when a negative pulse is applied to the base of transistor Q5A, this transistor is cut off and the other transistor Q5B, of the one-shot, begins to conduct. The resulting output of the one-shot multivibrator, appearing at the collector of transistor Q5B, is a series of equal energy negative voltage pulses; one output pulse being produced for each cycle of the veriable frequency input signal from the wayside, and therefore, the average output of the one-shot is directly proportional to the frequency output of wayside oscillator VFO, of FIG. 1.

This series of equal energy pulses is applied to an emitter follower circuit, including transistor Q6, having inductor 28 connected in series in its emitter circuit. This inductor 28, together with capacitor 29, forms a low-pass filter and is utilized as an averaging circuit to produce a D.C. voltage at Point A, in FIG. 2B, whose magnitude is: proportional to the number of output pulses produced by the foramentioned one-shot multivibrator; proportional to the variable frequency of the signal received from the variable frequency oscillator VFO; and therefore, also portional to the desired vehicle speed.

This D.C. voltage analog of the desired vehicle speed, from the averaging low-pass filter circuit is then applied to wire 30, in FIG. 2B, via an impedance matching circuit, including transistor Q7, which matches the filter impedance to the impedance of the subsequent circuits, of FIG. 2D, wherein the D.C. voltage is to be utilized, as will be described, and furthermore, this impedance matching circuit also aids in reducing the ripple of the D.C. voltage analog. Connected between the base and collector of transistor Q7 is a thermistor 31 which is utilized, in a conventional manner, to compensate for ambient temperature variations.

The amplified square wave output from transistor Q3 (appearing on wire 24) is furthermore applied, through diode 32, of FIG. 2B, to an averaging circuit, including resistor 33 and capacitor 34, connected to the base of transistor Q4A, of FIG. 2B; which transistor Q4A is included in a Schmitt trigger circuit with transistor Q4B. Normally, this Schmitt trigger circuit is biased so that transistor Q4A is conducting while transistor Q4B is cutoff, so that relay TV, connected in series in the collector circuit of transistor Q4B, is normally deenergized.

However, as long as receiver coils RC, of FIG. 1, are receiving a variable frequency signal from wayside oscillator VFO, of FIG. 1, and a series of square wave pulses are therefore being applied to the averaging circuit, including resistor 33 and capacitor 34, the base of transistor Q4A is consequently biased beyond cut-off and transistor Q4B therefore conducts. In this manner, relay TV is only picked up when a variable frequency signal is being received from the wayside, and therefore, the relay TV provides a registration on the vehicle V indicative that the vehicle is desired to operate at the variable desired speed.

Figure 2C:
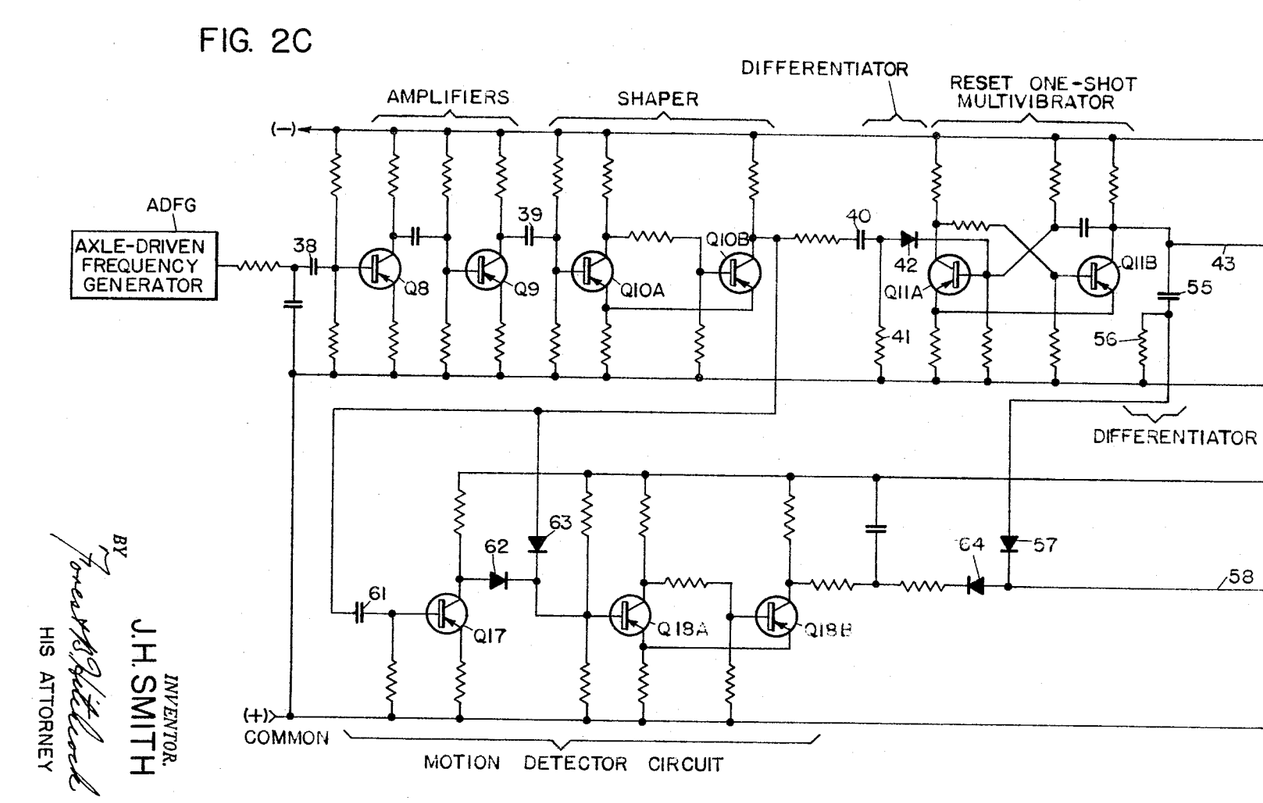
Figure 4:
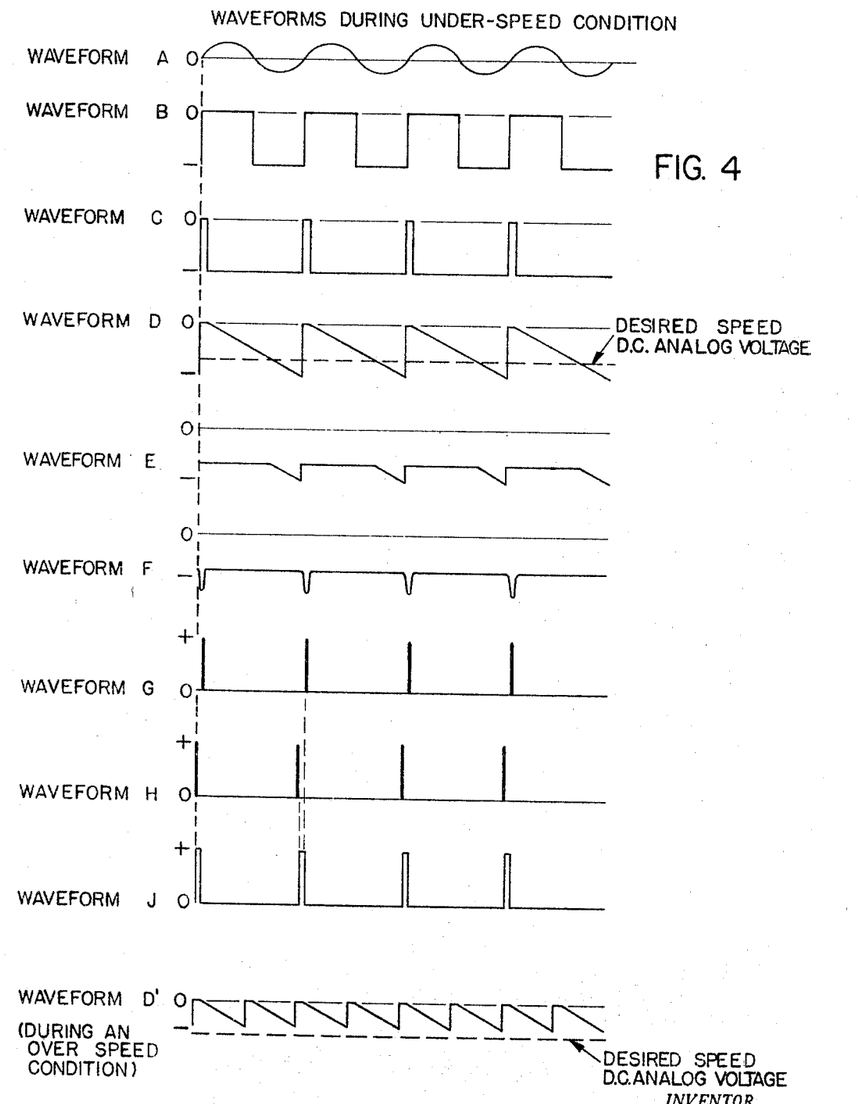
FIG. 4 illustrates certain typical circuit waveforms developed during operation of the vehicle carried apparatus, of FIGS. 2A through 2D.

An axle-driven frequency generator ADFG, of FIG. 2C is provided on the vehicle V and is utilized to produce a sinusoidal output signal whose freqency is proportional to, or in other words the analog of, the actual vehicle speed (see Waveform A, FIG. 4). This output signal from generator ADFG is applied, through coupling capacitor 38, to a two stage amplifier circuit including transistors Q8 and Q9 which are so biased that the output signal appearing on the collector of transistor Q9 is an amplified sine wave of the same frequency as the sinusoidal output signal from frequency generator ADFG.

This amplified since wave is applied, through capacitor 39, as input to a Schmitt trigger shaping circuit, including transistors Q10A and Q10B, which is circuited so that, during the negative half-cycles of the sine wave it is in its quiescent state; that is, transistor Q10A conducting and transistor Q10B cut-off. However, each positive half-cycle of the sine wave applied to the base of transistor Q10A causes transistor Q10A to be cut-off and transistor Q10B to conduct so that its collector voltage decreases positively from the negative supply voltage which is assumed here to be −24 volts towards zero or the circuit Common. In this manner, the sine wave pulses applied to the base of transistor Q10A are converted into a series of square wave pulses (see Waveform B, FIG. 4), appearing at the collector of transistor Q10B.

This series of square wave pulses is then differentiated by a differentiator circuit, including capacitor 40 and resistor 41, to produce a series of alternate positive and negative pulses. However, diode 42 is provided to pass only the positive going pulses to the base of transistor Q11A which is included in a reset one-shot multivibrator, along with transistor Q11B, the purpose of which will be discussed in detail hereinafter. The resulting output of the reset one-shot multivibrator, appearing at the collector of transistor Q11B, is a series of relatively narrow, positive going pulses (see Waveform C, FIG. 4) which are then applied, over wire 43, to the base of transistor Q12, of FIG. 2D, which acts as a ramp reset circuit, as will be described. It should be noted that one pulse is generated by the reset one-shot multivibrator for each cycle output from the axle-driven frequency generator ADFG.

Figures 2D, 3:
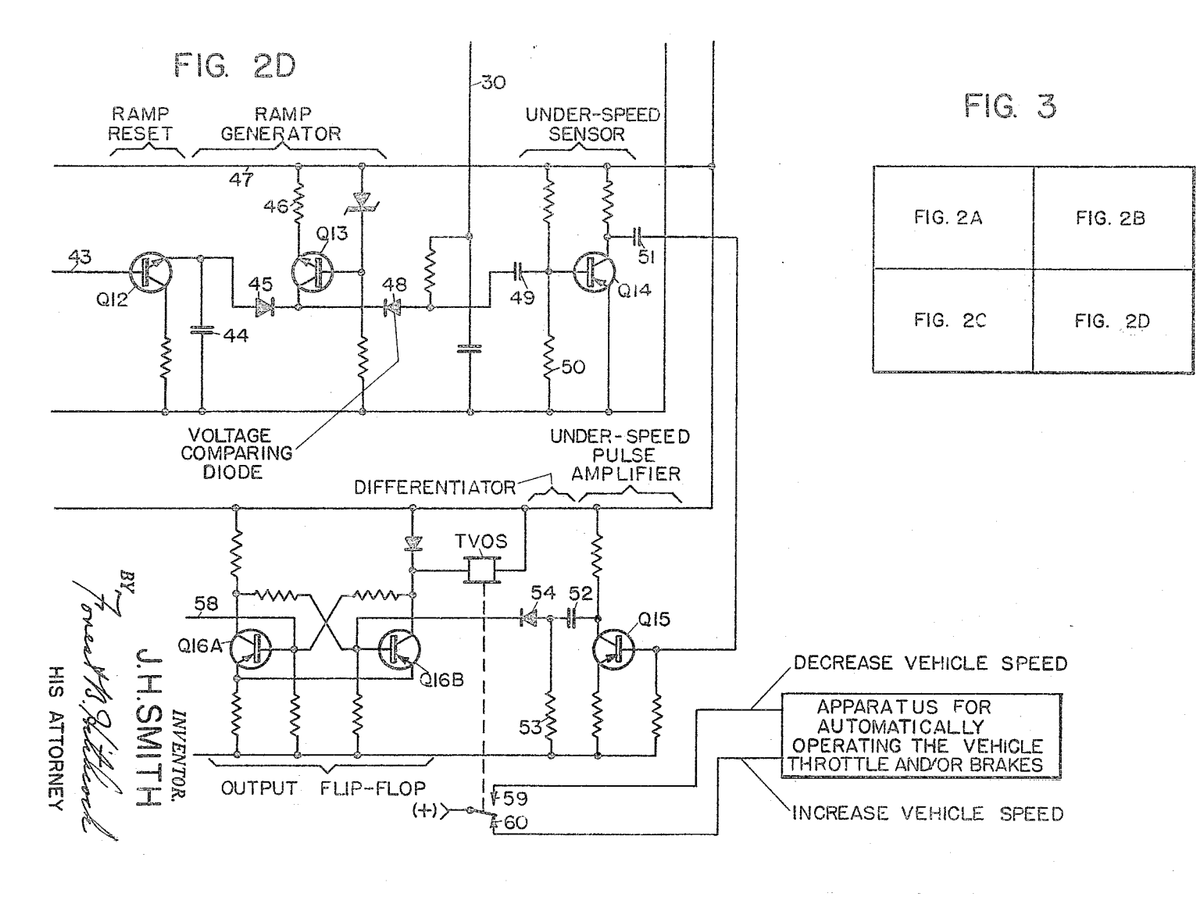
FIG. 3 is an arrangement diagram illustrating the proper arrangement of FIGS. 2A through 2D.

A ramp generator circuit, including transistor Q13, is provided to obtain a series of ramp voltage pulses, for comparison with the desired speed D.C. analog voltage appearing on wire 30, between FIGS. 2B and 2D. More specifically, while ramp reset transistor Q12 is cut-off, capacitor 44 of FIG. 2D attempts to charge through diode 45, transistor Q13 and resistor 46, towards the negative supply voltage appearing on wire 47 and which is assumed here to be −24 volts. However, each time a reset pulse is applied, along wire 43, from the reset one-shot multivibrator, of FIG. 2C, to the base of the ramp reset transistor Q12, transistor Q12 conducts and capacitor 44 is shorted, and therefore, appearing on the collector of transistor Q13, is a series of ramp voltage pulses (see Waveform D, FIG. 4), the maximum magnitude of which is dependent upon the time between pulses from the reset one-shot multivibrator, of FIG. 2C.

As previously mentioned, this multivibrator produces one output pulse for each cycle output from the axle-driven frequency generator ADFG, of FIG. 2C. Thus, the number of pulses produced by the reset one-shot multivibrator in a given time is directly proportional to the actual vehicle speed, and therefore, the magnitude attained by the above-mentioned ramp voltage pulses is inversely proportional to the actual vehicle speed; i.e. as the vehicle speed increases, the magnitude of the ramp voltage pulses decreases, and conversely, as the speed decreases, the capacitor 44 can charge further towards the negative supply voltage and the magnitude of the ramp voltage pulses thereby increases.

This series of ramp voltage pulses is then compared on a magnitude basis, with the D.C. voltage analog of the desired vehicle speed (appearing on wire 30), at voltage comparing diode 48, of FIG. 2D. As long as the magnitude of the ramp voltage pulses is less than that of the D.C. analog voltage of desired speed (see Waveform D′, FIG. 4), indicating that the vehicle V is over-speed, the diode 48 is back biased and will not conduct. However, if the vehicle V is under-speed, the capacitor 44 can charge to a greater magnitude (see Waveform D, FIG. 4) so that the magnitude of the ramp voltage pulse increases above the magnitude of the desired speed D.C. analog voltage. The diode 48 will therefore now be forward biased and conduct to apply a series of clamped ramp pulses (see Waveform E, FIG. 4) to the under-speed sensor circuit, of FIG. 2D, which includes transistor Q14 and a differentiating circuit made up of capacitor 49 and resistor 50. This differentiating circuit produces a series of positive going voltage pulses at the base of transistor Q14, and results in a series of corresponding negative pulses (see Waveform F, FIG. 4) appearing at the collector of transistor Q14.

This series of negative voltage pulses is applied, through capacitor 51, as input to the under-speed pulse amplifier circuit, of FIG. 2D, including transistor Q15, and resulting at the collector of transistor Q15 is a series of positive going voltage pulses which are differential at capacitor 52 and resistor 53 to obtain sharp positive pulses (see Waveform G, FIG. 4) which are applied, through diode 54, to the base of the right-hand transistor Q16B of the output flip-flop circuit, of FIG. 2D.

The positive going reset pulses from the previously described reset one-shot multivibrator, of FIG. 2C, are also applied to a differentiating circuit, including capacitor 55 and resistor 56, to obtain sharp positive voltage pulses (see Waveform H, FIG. 4) which are then applied, through diode 57 and along wire 58 between FIGS. 2C and 2D, to the base of the left-hand transistor Q16A, of the output flip-flop circuit mentioned above. Because of the inherent circuit delay produced by the ramp generator and under-speed sensor circuitry, previously mentioned, the sharp positive pulses, produced by differentiating the reset pulses, are applied to the base of transistor Q16A slightly before the corresponding sharp positive pulses, produced by differentiating the under-speed pulses, are applied to the base of transistor Q16B.

This output flip-flop circuit is normally biased so that transistor Q16A is normally conducting and transistor Q16B is normally cut-off. Therefore, when a positive going differentiated reset pulse is first applied to the base of transistor Q16A, this transistor is momentarily turned off and transistor Q16B is momentarily turned on to cause current to flow through the over-speed relay TVOS, of FIG. 2D; such relay being connected in series in the collector circuit of transistor Q16A. However, as soon as the differentiated under-speed pulse is applied to the base of transistor Q16B, this transistor is immediately turned off and terminates current flow through over-speed relay TVOS. The resulting waveform at the collector of transistor Q16B is a series of very narrow voltage pulses (see Waveform J, FIG. 4) applied to the over-speed relay TVOS, which are ineffective to cause pick-up of the relay, and, relay TVOS therefore remains dropped away to indicate that the actual vehicle speed is less than the desired vehicle speed.

However, as previously discussed, if the vehicle V were travelling at too high a speed; i.e. is over-speed, the ramp voltage pulses appearing at the collector of ramp generator transistor Q13, of FIG. 2D, would not attain a magnitude greater than the D.C. voltage analog of the desired speed (see Waveform D′, FIG. 4). Therefore, no under-speed pulses would be generated at the collector of transistor Q14, and consequently, no positive pulses would be applied to the base of transistor Q16B, as previously described, to turn transistor Q16B off, after once being turned on because of the differentiated reset pulse applied to transistor Q16A, from the reset one-shot multivibrator of FIG. 2C. Under these conditions, the transistor Q16B is permitted to conduct long enough to pick up over-speed relay TVOS, which indicate that the actual vehicle speed is greater than the desired vehicle speed.

In view of the foregoing discussion, it is seen that when the actual vehicle speed is less than the desired vehicle speed, the ramp voltage pulses appearing at the collector of ramp generator transistor Q13 are permitted to obtain a voltage which is greater than the D.C. analog voltage of the desired vehicle speed, and therefore, the series of under-speed pulses are developed which are utilized to maintain the over-speed relay TVOS in its deenergized position, to indicate an under-speed condition.

However, when the actual vehicle speed is greater than the desired vehicle speed, the time between reset pulses is diminished, and therefore, the ramp voltage pulses cannot obtain the magnitude necessary to produce the under-speed pulses. Therefore, such under-speed pulses are not produced and there is nothing applied to the base of transistor Q16B, of FIG. 2D, which can prevent the over-speed relay TVOS from picking up, to indicate the over-speed condition.

In the illustrated embodiment of the present invention, the relay TVOS is shown, by way of example as controlling Apparatus for Automatically Operating the Vehicle Throttle and/or Brakes, of FIG. 2D. Such automatic control apparatus is well-known in the art, and, is assumed here to be utilized both to automatically decrease the speed of vehicle V to the desired speed if relay TVOS is picked up to close its front contact 59 and thereby cause energization of the Decrease Vehicle Speed control wire, and also, to automatically increase the speed of vehicle V to the desired speed if relay TVOS is dropped away (as shown) to close its back contact 60 and thereby energize the Increase Vehicle Speed control wire. For example, when front contact 59 of relay TVOS is closed, the throttle setting on the vehicle V would be automatically decreased to decrease the vehicle speed; whereas, the closure of back contact 60 of relay TVOS would cause the vehicle throttle setting to be automatically increased, to increase the vehicle speed.

It should be obvious that, if desired, the brakes of the vehicle V could be automatically applied, along with or in preference to the throttle reduction mentioned above, in order to decrease the vehicle speed when the Decrease Vehicle Speed control wire is energized, as described above. However, it should be pointed out at this time that if the control system of the present invention were being utilized, as discussed above, to automatically control railway trains at very low speeds, for example at between one-eighth and three-eighths mile per hour, it would be undesirable to utilize the train air brakes to decrease the train speed when over-speed is detected, since the brakes require a finite release time, and therefore, any brake application at such low speeds is likely to bring the train to a stop. Therefore, during such low speed control, it would be advisable to maintain the desired vehicle speed by merely controlling the power output from the vehicle driving unit, by adjusting the vehicle throttle, etc.

The motion detector circuit, of FIG. 2C, is provided, in the selected embodiment of the present invention, to insure that the output flip-flop circuit, of FIG. 2D, is returned to its normal operating condition (transistor Q16A conducting and transistor Q16B cut-off), when the vehicle V is brought to a stop, and thus guards against the possibility of having over-speed relay TVOS in its picked up position, when the vehicle V is standing still. Thus, if this motion detector circuit were not provided, it might be possible (particularly if the vehicle stops rapidly after having its speed automatically reduced) that the underspeed pulses, necessary to cause deenergization of the over-speed relay TVOS, would not be properly developed, and therefore, the relay TVOS might be picked up, when the vehicle V is stopped, and thus prevent the vehicle from properly increasing its speed in order to get underway when a proceed signal is subsequently received from the wayside.

More specifically, as long as the vehicle V is in motion, the shaper circuit, of FIG. 2C, produces negative square wave output pulses, as previously described, which are applied, through coupling capacitor 61, as input to transistor Q17. Each time one of these negative pulses is applied to the base of this transistor Q17, the transistor conducts heavily and the collector voltage increases positively and therefore, the resulting output at the collector of transistor Q17 is therefore a series of positive going pulses.

Transistors Q18A and Q18B, of FIG. 2C, form a Schmitt trigger circuit wherein the base of transistor Q18A is supplied with a negative quiescent biasing voltage effectve to cause transistor Q18A to conduct and transistor Q18B to be cut-off, when there are no input signals to the circuit.

However, with the vehicle V in motion, the output from the shaper circuit, described above, is effective to cut-off transistor Q18A and allow transistor Q18B to conduct. More specifically, each time a negative pulse is produced at the collector of transistor Q10B, the resulting positive pulse appearing at the collector of transistor Q17 is applied through diode 62 to the base of transistor Q18A to cut this transistor off (transistor Q18B conducts), and, during the time between such negative pulses, the relatively positive collector voltage of transistor Q10B is effective to forward bias the diode 63 and maintain transistor Q18A cut-off and transistor Q18B conducting.

Under these conditions; i.e. motion occurring, the collector voltage of transistor Q18B is positive with respect to the right-hand side of diode 64 and therefore, this diode is back-biased and consequently the motion detector circuit has no effect on the output flip-flop circuit, of FIG. 2D.

On the other hand, when there are no negative output pulses from the shaper circuit, of FIG. 2C; i.e. the vehicle V is not in motion, the transistor Q17 will be cut-off and the transistor Q18A will be driven into conjunction, as previously described, to cut-off transistor Q18B. This obviously will cause the collector voltage on transistor Q18B to increase negatively towards the negative supply voltage, and, diode 64 will therefore now be forward biased and cause a negative biasing voltage to be applied, over wire 58, to the base of transistor Q16A, of FIG. 2D, sufficient to actuate the output flip-flop circuit to that condition wherein over-speed relay TVOS is properly dropped away to open its front contact 60. This motion detector circuit thus biases the output flip-flop circuit to its under-speed operating condition and therefore insures that the relay TVOS will not be retained in its picked up or over-speed position when the vehicle V is standing still, for reasons previously explained.

Having thus described a vehicle speed control system as one specific embodiment of the present invention, it is desired to be understood that this form is selected to facilitate in the disclosure of the invention rather than to limit the number of forms which it may assume; and, it is to be further understood that various modifications, adaptations and alterations may be applied to the specific form shown to meet the requirements of practice, without in any manner departing from the spirit or scope of the present invention.

What I claim is:

1. Apparatus for detecting the relative frequencies of first and second input signals comprising, in combination,
    (a) first circuit means for converting said first input signal into a D.C. voltage signal having a magnitude proportional to the frequency of said first input signal,
    (b) first pulse generating means responsive to said second input signal for generating a pulse series containing one pulse for each cycle of said second input signal,
    (c) ramp voltage generating means responsive to said generated pulse series rendered effective during the interval between adjacent pulses of said series to generate a ramp voltage signal which attains a magnitude directly proportional to the time between said adjacent pulses and inversely proportional to the frequency of said second input signal, and
    (d) means operably connected to compare the magnitudes of said D.C. voltage signal and said ramp voltage signal.

2. The apparatus specified in claim 1 adapted for use in a speed control system for vehicles wherein, (a) one of said first and second input signals has a frequency variable in proportion to a desired vehicle speed,
(b) the other of said input signals has a frequency variable in proportion to the actual vehicle speed, and
(c) said comparing means is effective to produce an output indicative of the relative magnitude of said actual and desired vehicle speeds.

3. A speed control system for a vehicle desired to operate at a predetermined speed comprising,
(a) means for generating a D.C. voltage signal whose magnitude is proportional to said desired vehicle speed,
(b) means controlled in accordance with the actual speed of said vehicle for generating a second signal whose frequency is proportional to said actual vehicle speed,
(c) means controlled by said second signal for generating a first series of voltage pulses, one of said pulses being generated for each cycle of said second generated signal,
(d) means controlled by said first series of pulses for generating a second series of ramp voltage pulses, each of said ramp voltage pulses occurring between adjacent pulses of said first series of pulses and attaining a magnitude which is proportional to the time between said adjacent pulses, whereby the magnitude of said ramp voltage is proportional to the actual vehicle speed, and
(e) means operably connected to compare the magnitude of said ramp voltage pulses to the magnitude of said D.C. voltage signal for adjusting the actual vehicle speed to bring the magnitude of said ramp voltage pulses substantially into agreement with the magnitude of said D.C. voltage signal.

4. The speed control system specified in claim 3 wherein said D.C. voltage signal generating means includes,
(a) wayside means for transmitting a variable frequency signal to the vehicle whose frequency is proportional to the desired vehicle speed, and
(b) means on the vehicle including receiving means effective to receive said transmitted signal for converting the variable frequency signal transmitted from the wayside into a D.C. voltage signal whose magnitude is proportional to the frequency of said transmitted signal.

5. The speed control system specified in claim 3 wherein said ramp voltage pulse generating means includes,
(a) a capictor which is permitted to charge towards a predetermined voltage during the time between adjacent pulses of said first pulse series, and
(b) means effective to discharge said capacitor each time a pulse is generated by said first pulse series generating means.

6. A speed control system for a vehicle desired to operate at a predetermined speed comprising,
(a) means for generating a D.C. voltage signal whose magnitude is proportional to said desired vehicle speed,
(b) means controlled in accordance with the actual speed of said vehicle for generating a second signal whose frequency is directly proportional to said actual vehicle speed,
(c) means controlled by said second signal for generating a first series of pulses, one of said pulses being generated for each cycle of said second generated signal,
(d) means controlled by said first series of pulses for generating a second series of ramp voltage pulses, each of said ramp voltage pulses occurring between adjacent pulses of said first pulse series and attaining a magnitude which is proportional to the time between said adjacent pulses, whereby the magnitude of said ramp voltage pulses is proportional to the actual vehicle speed,
(e) means controlled by said D.C. voltage signal and said ramp voltage pulses for generating a third series of pulses only when the actual vehicle speed is less than said desired speed, and
(f) speed adjusting means effective to increase or decrease the actual vehicle speed depending respectively upon whether or not said third pulse series is being generated.

7. The speed control system specified in claim 6 wherein said speed adjusting means include circuit means having first and second operating conditions to register respectively that the actual vehicle speed is below or above said desired speed, said circuit means being controlled to its second operating condition by said first series of pulses when said third series of pulses is not being generated and being controlled to its first operating condition by said third series of pulses when said third series of pulses is being generated.

8. The speed control system specified in claim 7 wherein said circuit means include a flip-flop circuit having first and second operating conditions to register respectively that the actual vehicle speed is below or above said desired speed and having said first and third series of pulses applied as inputs thereto, said first series of pulses being applied so as to actuate said flip-flop circuit from its first to its second operating condition to register that the actual vehicle speed is above said desired vehicle speed and said third series of pulses being applied so as to actuate said flip-flop circuit from its second to its first operating condition to register that the actual vehicle speed is below said desired speed.

9. A speed control system for a vehicle desired to operate at a predetermined speed comprising,
(a) means for generating a D.C. voltage signal whose magnitude is proportional to said desired speed,
(b) means controlled in accordance with the actual speed of said vehicle for generating a second signal whose frequency is directly proportional to said actual vehicle speed,
(c) means controlled by said second signal for generating a first series of pulses, one of said pulses being generated for each cycle of said second generated signal,
(d) means controlled by said first series of pulses for generating a second series of ramp voltage pulses, each of said ramp voltage pulses occurring between adjacent pulses of said first pulse series and attaining a magnitude which is directly proportional to the time between said adjacent pulses, whereby the magnitude of said ramp voltage pulses is proportional to the actual vehicle speed,
(e) means for comparing the magnitude of said ramp voltage pulses to the magnitude of said D.C. voltage signal,
(f) means controlled in accordance with said comparison for generating a third series of pulses only when the magnitude of said D.C. voltage signal is less than the magnitude of said ramp voltage pulses, and
(g) speed adjusting means effective to increase or decrease the actual vehicle speed depending respectively upon whether or not said third series of pulses is being generated.

10. A speed control system for a vehicle desired to operate at a predetermined speed comprising,
(a) means for generating a D.C. voltage signal whose magnitude is proportional to said desired speed,
(b) means controlled in accordance with the actual speed of said vehicle for generating a second signal whose frequency is directly proportional to said actual vehicle speed,
(c) means controlled by said second signal for generating a first series of pulses, one of said pulses being generated for each cycle of said second generated signal, (d) means controlled by said first series of pulses for generating a second series of ramp voltage pulses, each of said ramp voltage pulses occurring between adjacent pulses of said first pulse series and attaining a magnitude which is proportional to the time between said adjacent pulses, whereby the magnitude of said ramp voltage pulses are proportional to the actual vehicle speed, (e) means controlled by said D.C. voltage signal and said ramp voltage pulses for generating a third series of pulses only when the actual vehicle speed is less than said desired vehicle speed, (f) a flip-flop circuit having first and second operating conditions to register respectively that the actual vehicle speed is below or above said desired speed and having said first and third series of pulses applied as inputs thereto, said first series of pulses being applied so as to actuate said flip-flop circuit from its first to its second operating condition to register that the actual vehicle speed is above said desired speed and said third series of pulses being applied so as to actuate said flip-flop circuit from its second to its first operating condition to register that the actual speed is below said desired speed, (g) means controlled by said flip-flop circuit for selectively increasing or decreasing the actual speed of said vehicle depending upon whether said flip-flop circuit is in its first or second operating condition respectively, and (h) motion detector means responsive to the actual speed of said vehicle effective to actuate said flip-flop circuit to its first operating condition if said vehicle comes to a standstill.

11. The speed control system specified in claim 10 wherein said motion detector means determines whether or not said vehicle is in motion by detecting whether said first pulse series is being generated.

12. A system for remote controlling a vehicle to operate along a right-of-way at a variable desired speed comprising, (a) a wayside source of carrier frequency, (b) a wayside variable frequency source effective to produce an output whose frequency is the analog of said variable desired speed, (c) means on the wayside for modulating said carrier frequency with the output signal of said variable frequency source, (d) means for transmitting said modulated carrier frequency from the wayside to said vehicle, (e) means on the vehicle including receiving means responsive to said modulated carrier frequency for converting the frequency analog of said variable desired vehicle speed into a D.C. voltage signal whose magnitude is proportional to said desired vehicle speed, (f) means controlled in accordance with the actual speed of said vehicle for generating a second signal whose frequency is proportional to said actual vehicle speed, (g) means controlled by said second signal for generating a first series of voltage pulses, one of said pulses being generated for each cycle of said second generated signal, (h) means controlled by said first series of pulses for generating a second series of ramp voltage pulses, each of said ramp voltage pulses occurring between adjacent pulses of said first series of pulses and attaining a magnitude which is proportional to the time between said adjacent pulses, whereby the magnitude of said ramp voltage is inversely proportional to the actual vehicle speed, and (i) means operably connected to compare the magnitude of said ramp voltage pulses to the magnitude of said D.C. voltage signal for adjusting the actual vehicle speed to bring the magnitude of said ramp voltage pulses substantially into agreement with the magnitude of said D.C. voltage signal.

13. In a system for registering the actual speed of a vehicle relative to a predetermined desired vehicle speed, the combination of, (a) means for generating a first voltage signal whose magnitude is proportional to said desired vehicle speed, (b) means controlled in accordance with the actual speed of said vehicle for generating a second signal whose frequency is proportional to said actual vehicle speed, (c) means controlled by said second signal for generating a first series of voltage pulses, one of said pulses being generated for each cycle of said second generated signal, (d) means controlled by said first series of pulses for generating a second series of ramp voltage pulses, each of said ramp voltage pulses occurring between adjacent pulses of said first series of pulses and attaining a magnitude which is proportional to the time between said adjacent pulses, whereby the magnitude of said ramp voltage is inversely proportional to the actual vehicle speed, (e) means operably connected to compare the magnitude of said ramp voltage pulses to the magnitude of said first voltage signal, and (f) registration means effective to register whether the actual vehicle speed is above or below said desired vehicle speed in response to the comparison made by said comparing means.

References Cited by the Examiner

UNITED STATES PATENTS

| | | | |
|---|---|---|---|
| 2,721,258 | 10/1955 | Freehafer | 246—182 |
| 2,772,378 | 11/1956 | Farkas | 324—78 X |
| 2,878,448 | 3/1959 | Maxey | 328—134 X |
| 2,907,022 | 9/1959 | Kendall. | |
| 2,921,260 | 1/1960 | Crandon et al. | 324—78 X |
| 3,018,367 | 1/1962 | Mountjoy | 246—182 |
| 3,018,368 | 1/1962 | Mountjoy | 246—182 |
| 3,038,066 | 6/1962 | Barry | 246—182 X |
| 3,074,015 | 1/1963 | Gerber | 324—78 |

ARTHUR L. LA POINT, *Primary Examiner.*

LEO QUACKENBUSH, EUGENE G. BOTZ,
*Examiners.*

S. B. GREEN, *Assistant Examiner.*